(12) United States Patent
Yamada et al.

(10) Patent No.: US 7,178,861 B2
(45) Date of Patent: Feb. 20, 2007

(54) VEHICLE BODY STRUCTURE

(75) Inventors: Hirotomo Yamada, Wako (JP);
Takahiro Uesaka, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 50 days.

(21) Appl. No.: 10/962,774

(22) Filed: Oct. 12, 2004

(65) Prior Publication Data
US 2005/0082878 A1 Apr. 21, 2005

(30) Foreign Application Priority Data
Oct. 16, 2003 (JP) .............................. 2003-356959

(51) Int. Cl.
*B60R 27/00* (2006.01)
(52) U.S. Cl. ............. 296/204; 296/193.07; 296/187.08
(58) Field of Classification Search ........... 296/193.07, 296/193.09, 204, 205, 203.02, 187.01, 187.03, 296/187.08, 187.09, 187.12, 193.01, 209, 296/203.03
See application file for complete search history.

(56) References Cited

U.S. PATENT DOCUMENTS

| | | | |
|---|---|---|---|
| 5,549,349 A | * | 8/1996 | Corporon et al. ...... 296/187.12 |
| 5,609,386 A | | 3/1997 | Takahashi et al. |
| 6,540,286 B2 | * | 4/2003 | Takemoto et al. .......... 296/204 |
| 6,793,276 B2 | * | 9/2004 | Sugihara et al. ............ 296/204 |
| 2001/0028179 A1 | * | 10/2001 | Takemoto et al. .......... 296/204 |
| 2003/0034673 A1 | * | 2/2003 | Sugihara et al. ............ 296/204 |

FOREIGN PATENT DOCUMENTS

| | | |
|---|---|---|
| JP | 60-199774 | 10/1985 |
| JP | 05-238419 | 9/1993 |
| JP | 6-67271 | 9/1994 |
| JP | 07-257435 | 10/1995 |
| JP | 10-007022 | 1/1998 |

\* cited by examiner

*Primary Examiner*—Lori L. Coletta
(74) *Attorney, Agent, or Firm*—Rankin, Hill, Porter & Clark LLP

(57) ABSTRACT

A vehicle body structure in which a hollow-section crossmember is attached to rear end portions of right and left center frame members is provided. Right and left extension members extending rearward are joined to the rear end portions of the right and left center frame members. The crossmember is joined to the tops of the right and left extension members. Right and left reinforcing plates are provided in a hollow space of the crossmember at portions at which the extension members are joined to the crossmember. The right and left reinforcing plates are supported on the right and left extension members, whereby the crossmember is firmly supported on the rear end portions of the center frame members and is increased in rigidity.

5 Claims, 6 Drawing Sheets

VEHICLE BODY STRUCTURE

FIELD OF THE INVENTION

The present invention relates to a vehicle body structure and, more particularly, to a vehicle body structure in which a crossmember is extended between right and left side sills, and a center frame member is extended from a substantially middle portion of the crossmember toward the vehicle front.

BACKGROUND OF THE INVENTION

A vehicle body structure in which a chassis frame member is extended longitudinally of a vehicle body and a crossmember is provided above the chassis frame member is disclosed in Japanese Utility Model Laid-Open Publication No. HEI-6-67271, for example. This vehicle body structure will be described with reference to FIG. 6 hereof.

A vehicle body structure 100 shown in FIG. 6 includes a chassis frame member 101 extending longitudinally of a vehicle body and a crossmember 103 provided above a middle portion of the chassis frame member 101 via a large torque box (reinforcing member) 102 which doubles as reinforcements.

The large reinforcing member 102 is formed in a closed section so that the crossmember 103 is firmly fixed above the middle portion of the chassis frame member 101.

It is thus necessary to use the large reinforcing member 102 for firmly fixing the crossmember 103 above the middle portion of the chassis frame member 101.

There is a vehicle having a vehicle body structure in which a crossmember is attached to a rear end portion of a chassis frame member (hereinafter, referred to as a center frame member). For this vehicle body structure, it is not preferable to use a large reinforcing member 102 as described above, in terms of space saving.

A vehicle body structure shown in FIG. 7 is a conceivable example of firmly attaching a crossmember to a rear end portion of a center frame member as described above.

A vehicle body structure 110 shown in FIG. 7 includes a center frame member 111 extending longitudinally of a vehicle body, and a floor panel 115 placed on the center frame member 111. A front lower edge 114 of the crossmember 113 is attached to a rear upper surface 112 of the center frame member 111.

A floor tunnel 116 is formed in the floor panel 115. A rear end 117 of the floor tunnel 116 is joined to a front wall 118 of the crossmember 113.

With this, the crossmember 113 is supported by the floor tunnel 116 without using a large reinforcing member 102 as shown in FIG. 6.

However, considering the comfort of passengers, it is preferable to remove the floor tunnel 116 to make the floor panel 115 flat. When the floor tunnel 116 is removed, the crossmember 113 cannot be supported by the floor tunnel 116.

Thus, desired is a vehicle body structure in which a floor panel is flat without a floor tunnel, and a crossmember can be well supported on a rear end portion of a center frame member with a simple configuration.

SUMMARY OF THE INVENTION

According to the present invention, there is provided a vehicle body structure, which comprises: a body; right and left side sills extending longitudinally of the body; a crossmember of a hollow section extending between the right and left side sills; at least one center frame member extending forward of the body from a substantially middle portion of the crossmember; an extension member provided at a rear end portion of the center frame member in such a manner as to extend rearward of the body, and joined to the crossmember placed thereon; and at least one reinforcing plate provided in a space of the hollow section of the crossmember at a portion to which the extension member is attached, for preventing deformation of the crossmember.

The extension member extending rearward of the body is provided at the rear end portion of the center frame member, and the hollow-section crossmember is placed on and joined to the extension member. This simple structure in which the relatively compact extension member is merely provided at the rear end portion of the center frame member allows the crossmember to be firmly attached to the center frame member.

In addition, the reinforcing plate is provided at the portion to which the extension member is attached, in the space of the hollow-section of the crossmember. With this, the reinforcing plate is firmly supported on the extension member, and the crossmember is reinforced by the firmly supported reinforcing plate. Thus, the crossmember is prevented from deformation.

With this simple structure in which the relatively compact extension member is extended rearward from the rear end portion of the center frame member, and the reinforcing plate is provided in the space of the hollow crossmember, the crossmember is firmly supported on the rear end portion of the center frame member and increased in rigidity. Thus, this structure can eliminate the need for a large reinforcing member required in a conventional art, resulting in space saving, and also eliminates the need for supporting the crossmember by a floor tunnel as in a conventional art. A floor tunnel can thus be eliminated to make a floor panel flat.

Preferably, the at least one reinforcing plate includes a plate body, and the plate body is disposed diagonally from a corner formed by a front wall and a bottom portion of the crossmember to a corner formed by a rear wall and a ceiling portion of the crossmember. When a rearward-deforming force acts on the crossmember, the plate body is subjected to a tensile load, preventing deformation of the crossmember.

BRIEF DESCRIPTION OF THE DRAWINGS

Preferred embodiments of the present invention will be described in detail below, by way of example only, with reference to the accompanying drawings, in which.

DETAILED DESCRIPTION OF THE PREFERRED EMBODIMENTS

Figure 1:
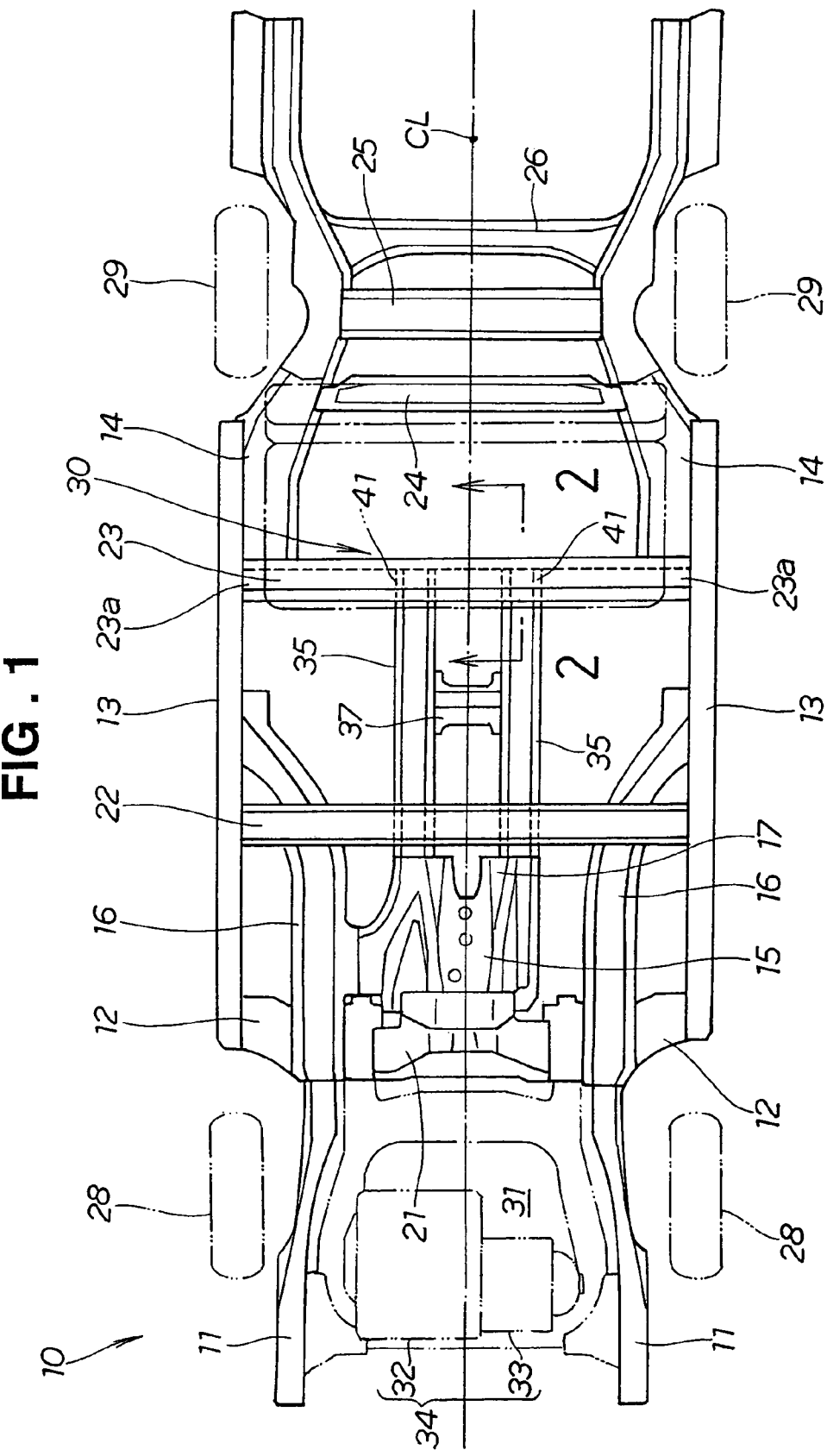
FIG. 1 is a plan view of a vehicle frame including a vehicle body structure according to the present invention.

Referring to FIG. 1, a vehicle frame 10 includes right and left front side members 11, 11, right and left side outriggers 12, 12, right and left side sills 13, 13, right and left rear side members 14, 14, a floor tunnel 15, right and left floor frame members 16, 16, and six crossmembers 21, 22, 23, 24, 25 and 26.

The right and left front side members 11, 11 extend longitudinally in the vehicle front. The right and left side outriggers 12, 12 are joined to rear side walls of the right and left front side members 11, 11. The right and left side sills 13, 13 extend rearward from the ends of the right and left side outriggers 12, 12. The right and left rear side members 14, 14 extend rearward from rear portions of the right and left side sills 13, 13. The floor tunnel 15 extends longitudinally on the longitudinal center line CL (in the middle of the vehicle width). The right and left floor frame members 16, 16 are provided right and left of the floor tunnel 15 and extend longitudinally. The first to sixth crossmembers 21, 22, 23, 24, 25 and 26 extend transversely.

Right and left front wheels 28, 28 are provided outside of the right and left front side members 11, 11. Right and left rear wheels 29, 29 are provided outside of the right and left rear side members 14, 14.

In an engine compartment 31 between the right and left front side members 11, 11 is provided an engine/transmission unit 34 in which an engine 32 and a transmission 33 are united.

The first to sixth crossmembers 21 to 26 are arranged from the front to the rear in this order at certain intervals.

The first crossmember 21 reinforces the bottom of a dashboard (not shown).

The second crossmember 22 is disposed rearward of the floor tunnel 15 and extended between nearly middle portions of the right and left side sills 13, 13.

The third crossmember (crossmember) 23 is extended between rearward portions of the right and left side sills 13, 13.

The fourth, fifth and sixth crossmembers 24, 25 and 26 are extended between midsections of the right and left rear side members 14, 14.

A rear end portion 17 of the floor tunnel 15 is joined to the second crossmember 22 and the third crossmember 23 via right and left center frame members (center frame member) 35, 35.

The right and left center frame members 35, 35 are aligned on the opposite sides of the longitudinal center line CL, extending longitudinally. A seventh crossmember 37 is extended between substantially middle portions of the right and left center frame members 35, 35.

The third crossmember 23 is attached to the rear ends of the right and left center frame members 35, 35, which structure constitutes a vehicle body structure 30 of this invention.

Figure 2:
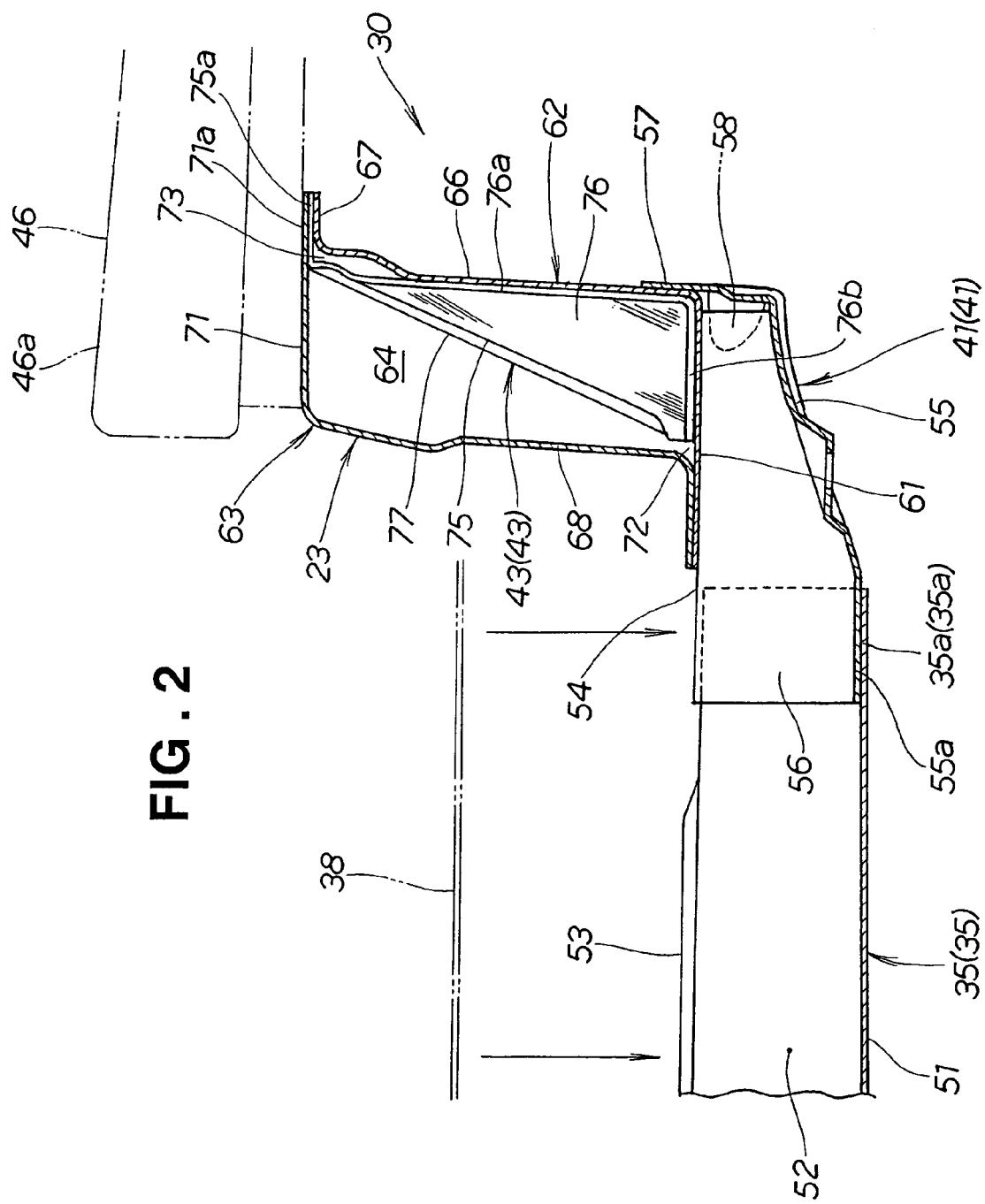
FIG. 2 is an enlarged cross-sectional view taken along line 2—2 of FIG. 1.
Figure 3:
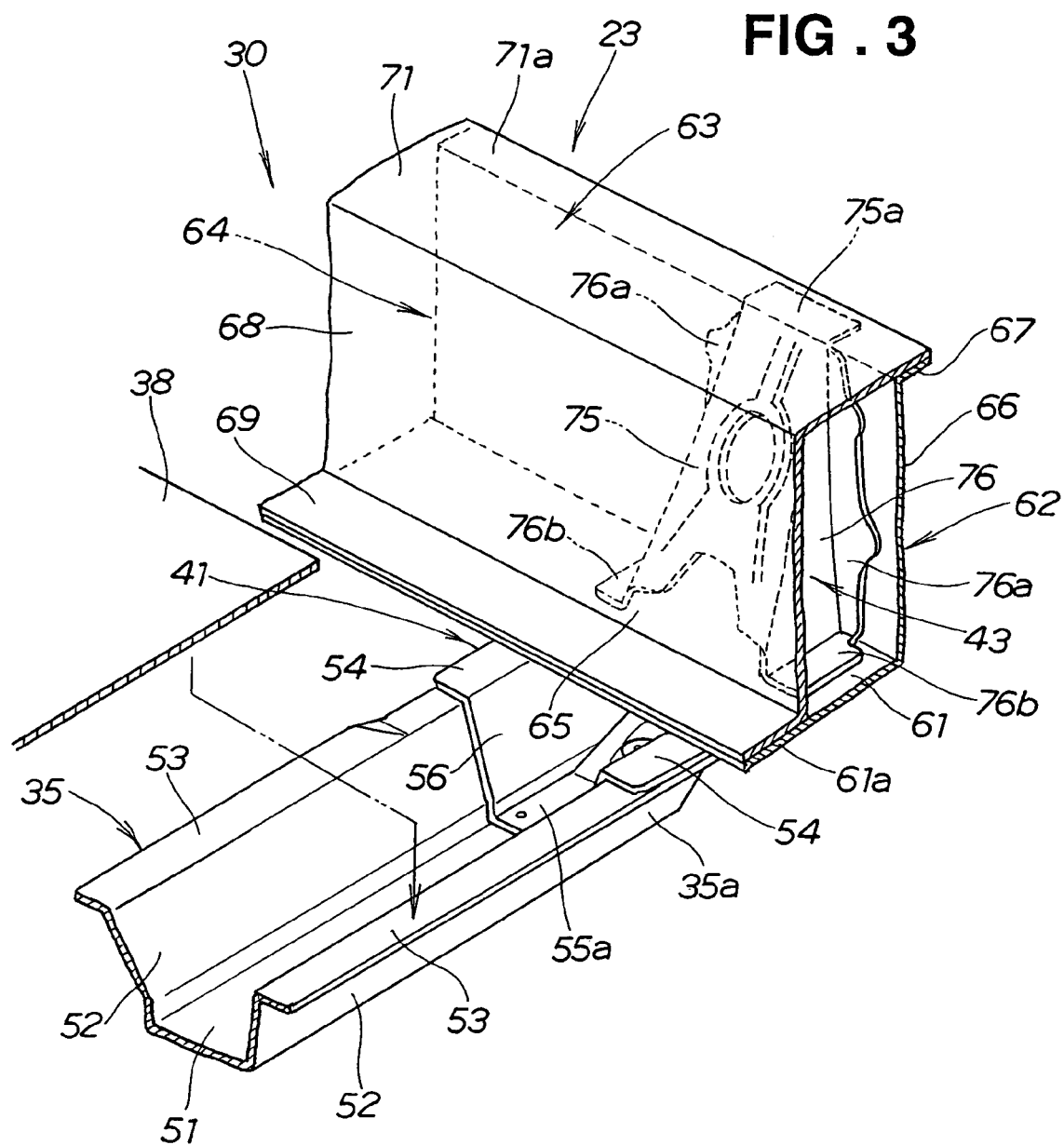
FIG. 3 is a perspective view of the vehicle body structure shown in FIG. 2.
Figure 4:
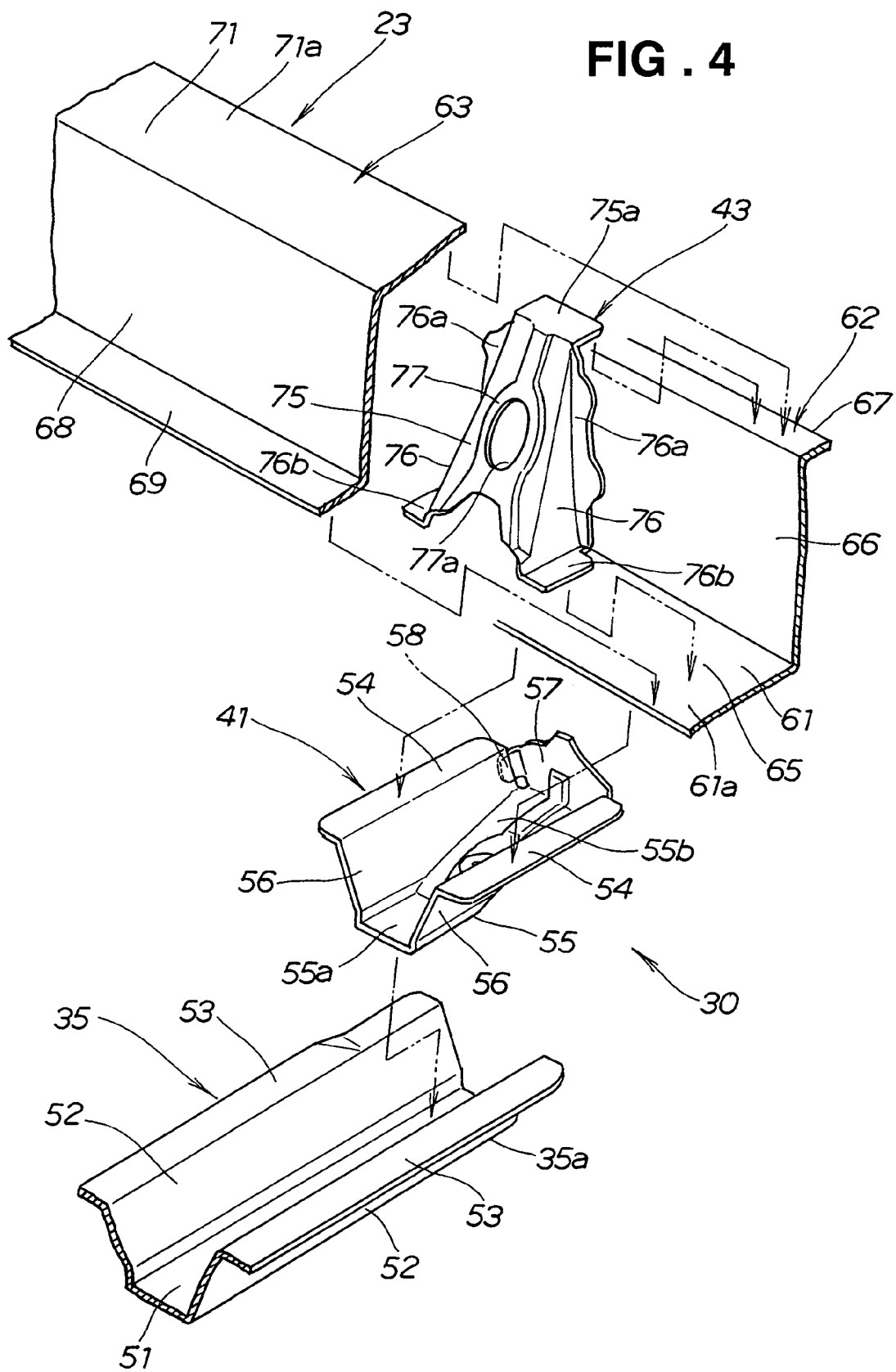
FIG. 4 is an exploded perspective view of the vehicle body structure shown in FIG. 3.

With reference to FIGS. 2, 3 and 4, the configuration of the vehicle body structure 30 of this invention, that is, the connection between the right and left center frame members 35, 35 and the third crossmember 30 will be described below. Since the right and left center frame members 35, 35 have the same configuration, only the left center frame member 35 will be described below, and the right center frame member 35 will not be described.

Referring to FIG. 2, the vehicle body structure 30 includes the third crossmember 23 of a hollow section extended between the right and left side sills 13, 13 (see FIG. 1) which extend longitudinally, the right and left center frame members 35, 35 (only one is shown) extending forward from a substantially middle portion of the third crossmember 23, and a floor panel 38 placed on upper portions of the right and left center frame members 35, 35. The floor panel 38 is reinforced by the right and left center frame members 35, 35.

Right and left extension members 41, 41 (only one is shown) are attached to rear end portions 35a, 35a of the right and left center frame members 35, 35, and extend rearward from the rear end portions 35a, 35a. The hollow-section third crossmember 23 is placed on the right and left extension members 41, 41. Right and left reinforcing plates 43, 43 (only one is shown) for preventing deformation of the third crossmember 23 are provided in the hollow of the third crossmember 23 at portions 65 (see FIG. 3) in contact with the right and left extension members 41, 41.

The third crossmember 23 supports a front edge portion 46a of a seat cushion 46.

As shown in FIG. 3, a bottom surface 51 of the center frame member 35 extends longitudinally horizontally. Inclined walls 52, 52 are raised from the opposite side edges of the bottom surface 51 with outward inclinations. Upper joined portions 53, 53 are extended horizontally from the upper edges of the pair of inclined walls 52, 52, so that the center frame member 35 has a substantially U-shaped section.

The extension member 41 is attached to the rear end portion 35a of the center frame member 35. The extension member 41 includes a pair of upper joined portions 54, 54 to which a bottom portion 61 of the third crossmember 23 is attached. The extension member 41 will be described in detail below with reference to FIG. 4.

The third crossmember 23 includes a rear L-shaped member 62 to be placed on the center frame members 35 and a front L-shaped member 63 joined to the rear L-shaped member 62 to form a rectangular section (closed section).

The rear L-shaped member 62 includes the bottom portion 61 to be joined to the right and left center frame members 35, 35 (see also FIG. 2), a rear wall 66 raised from the rear edge of the bottom portion 61, and a rear joined portion 67 extended rearward from the upper edge of the rear wall 66.

The front L-shaped member 63 includes a front wall 68 disposed forward of the rear wall 66 at a certain interval, a front joined portion 69 extended forward from the bottom of the front wall 68 to be joined to a front portion 61a of the bottom portion 61, and a ceiling portion 71 extending rearward from the upper edge of the front wall 68 and joined to the rear joined portion 67 at its rear portion 71a.

That is, the third crossmember 23 has a rectangular hollow section formed by the bottom portion 61 to be placed on the extension member 41, the front and rear walls 68, 66 raised from the bottom portion 61, and the ceiling portion 71 connected to the upper edges of the front and rear walls 68, 66, thereby forming a space 64 in the hollow section (see also FIG. 2).

In the space 64 in the hollow section of the third crossmember 23 is provided the reinforcing plate 43 at the portion 65 in contact with the center frame member 35.

As shown in FIG. 4, the reinforcing plate 43 includes a substantially rectangular plate body 75 extending diagonally from a corner 72 (see FIG. 2) formed by the front wall 68 and the bottom portion 61 of the third crossmember 23 to a corner 73 (see FIG. 2) formed by the rear wall 66 and the ceiling portion 71. The plate body 75 is provided at its opposite sides with triangular reinforcing walls 76, 76. The reinforcing walls 76, 76 are provided with vertical joined portions 76a, 76a extended outward from the sides thereof, and lower joined portions 76b, 76b extended horizontally outward from the bases of the reinforcing walls 76, 76. The plate body 75 is provided with an upper joined portion 75a bent rearward from its upper edge.

The plate body 75 includes a raised portion 77 formed with an opening 77a at its center.

The reinforcing plate 43 can be relatively easily manufactured by press-molding a plate material, for example.

The upper joined portion 75a is joined in such a manner as to be interposed between the rear joined portion 67 of the third crossmember 23 and the rear portion 71a of the ceiling portion 71 (see FIG. 2). The pair of vertical joined portions 76a, 76a are joined to the rear wall 66 of the third crossmember 23. The pair of lower joined portions 76b, 76b are joined to the bottom portion 61 of the third crossmember 23.

The reinforcing plate 43 is fixed in the space 64 at the portion 65 of the third crossmember 23 in contact with the extension member 41. Thus, the reinforcing plate 43 is firmly supported on the extension member 41, and the third crossmember 23 is resultantly well reinforced by the reinforcing plate 43.

The reinforcing walls 76, 76 provided at the plate body 75 are joined to the rear L-shaped member 62, thereby to form a closed section between the reinforcing plate 43 and the rear L-shaped member 62. As a result, the third crossmember 23 can be provided with sufficient rigidity by the compact reinforcing plate 43.

The extension member 41 includes a bottom portion 55 consisting of a horizontal front portion 55a and an inclined portion 55b extending rearward and upward from the front portion 55a. Inclined walls 56, 56 are raised outward from the opposite sides of the bottom portion 55, and the upper joined portions 54, 54 are extended horizontally from the upper edges of the inclined walls 56, 56. Thus, the extension member 41 has a U-shaped section. A rear wall 57 is raised upward from the rear edge of the bottom portion 55. The rear wall 57 includes bent portions 58, 58 bent in such a manner as to extend forward from the opposite sides thereof (the left one is not shown). The bent portions 58, 58 are joined to rear end portions of the inclined walls 56, 56.

The left extension member 41 can be relatively easily manufactured by press-molding a plate material, for example. A rear half portion of the bottom portion 55 is formed as the inclined portion 55b, thereby to save space below the rear half portion of the extension member 41 and reduce the weight of the extension member 41.

The front portion 55a of the bottom portion 55 of the extension member 41 is joined to a rear portion of the bottom portion 51 of the center frame member 35. The inclined walls 56, 56 of the extension member 41 are joined to rear portions of the inclined walls 52, 52 of the center frame member 35. The upper joined portions 54, 54 of the extension member 51 are joined to the upper joined portions 53, 53 of the center frame member 35, whereby the extension member 41 is attached to the rear end portion 35a of the center frame member 35.

The upper joined portions 54, 54 of the extension member 41 are joined to the bottom portion 61 of the third crossmember 23, and the rear wall 57 of the extension member 41 is joined to the rear wall 66 of the third crossmember 23, whereby the extension member 41 is fixed to the bottom portion 61 of the third crossmember 23.

Now, with reference to FIG. 4, the assembly of the vehicle body structure 30 will be described.

First, the upper portions of the extension member 41 are joined to the bottom portion 61 of the rear L-shaped member 62 of the third crossmember 23 by spot welding, for example.

In conjunction with the joining, the reinforcing plate 43 is joined to the portion 65 of the rear L-shaped member 62 in contact with the extension member 41, by spot welding, for example.

Then, the front L-shaped member 63 of the third crossmember 23 is joined to the rear L-shaped member 62 of the third crossmember 23 by spot welding, for example.

In this manner, the extension member 41 and the third crossmember 23 are united.

The rear end portion 35a of the center frame member 35 is joined to the extension member 41 of the united member by spot welding, for example.

With this, the assembly of the vehicle body structure 30 is completed.

The above-described structure shown in FIG. 1, in which the right and left extension members 41, 41 are attached to the rear end portions of the right and left center frame members 35, 35, allows the right and left extension members 41, 41 and the third crossmember 23 to be united.

Thus, the assembling process can be facilitated, resulting in improved productivity.

In the above-described vehicle body structure 30 as shown in FIGS. 1 to 4, the right and left extension members 41, 41 extending rearward are joined to the rear end portions 35a, 35a of the right and left center frame members 35, 35, and the hollow-section third crossmember 23 is placed on and joined to the extension members 41, 41.

This simple structure in which the relatively compact extension members 41, 41 are merely provided at the rear end portions 35a, 35a of the right and left center frame members 35, 35 allows the third crossmember 23 to be firmly attached to the right and left center frame members 35, 35.

In addition, the right and left reinforcing plates 43, 43 are provided at the portions 65, 65 in contact with the right and left extension members 41, 41, in the hollow-section third crossmember 23. With this, the right and left reinforcing plates 43, 43 are firmly supported on the right and left extension members 41, 41. Thus, the third crossmember 23 can be reinforced by the right and left reinforcing plates 43, 43, being prevented from deformation.

Despite this simple structure in which the relatively compact right and left extension members 41, 41 are extended rearward from the rear end portions 35a, 35a of the right and left center frame members 35, 35, and the relatively compact right and left reinforcing plates 43, 43 are provided in the hollow-section third crossmember 23, the third crossmember 23 is firmly supported on the right and left extension members 41, 41, and the rigidity of the third crossmember 23 is increased.

This structure can eliminate the need for a large reinforcing member required in a conventional art, resulting in space saving and reduction in vehicle weight.

Further, there is no need to support the third crossmember 23 by a floor tunnel as in a conventional art, and a floor tunnel can be eliminated from the floor panel 38.

Right and left ends 23a, 23a of the third crossmember 23 are fixed to the right and left side sills 13, 13 as shown in FIG. 1.

Figure 5:
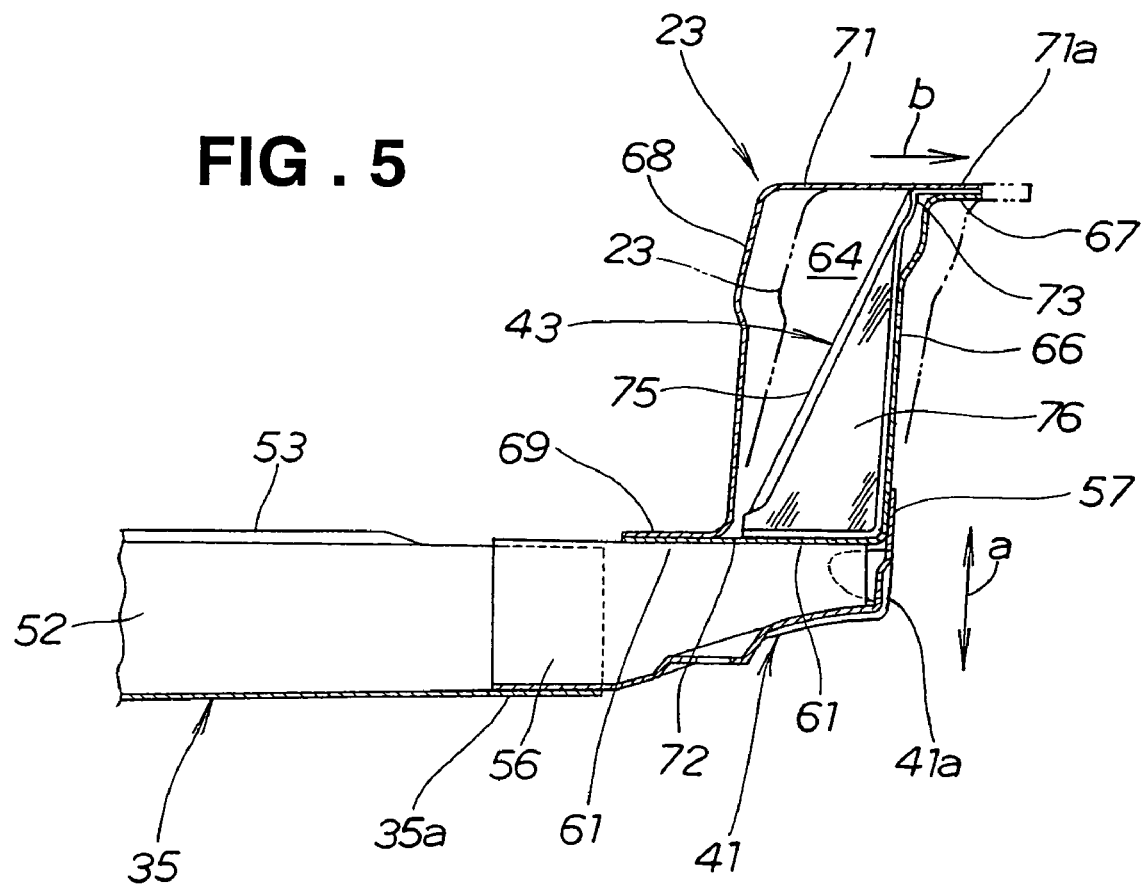
FIG. 5 is an explanatory view of the vehicle body structure when a rearward-deforming force acts on a crossmember.
Figure 6:
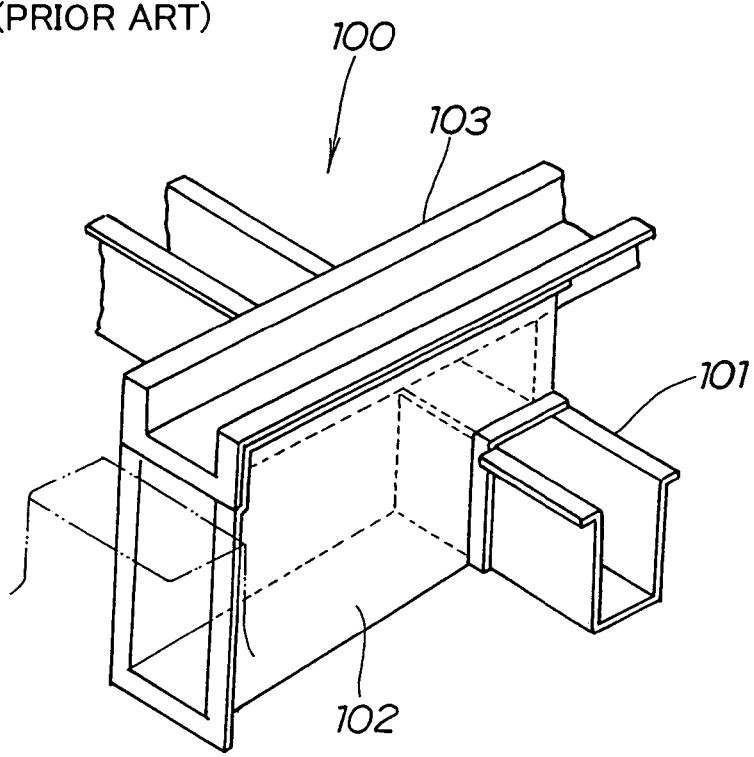
FIG. 6 is a perspective view of an exemplary conventional vehicle body structure.
Figure 7:
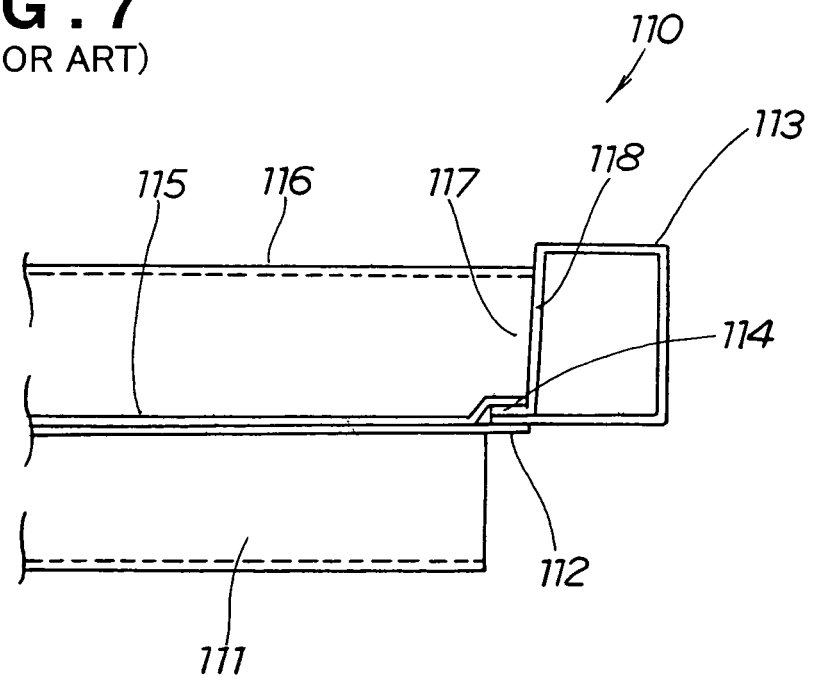
FIG. 7 is a schematic diagram of another exemplary conventional vehicle body structure.

In this vehicle body structure 30, the right and left center frame members 35, 35 and the right and left extension members 41, 41 move vertically as shown by arrows a in FIG. 5 during vehicle running.

Also, rear ends 41a, 41a of the right and left extension members 41, 41 are free ends, so that the rear ends 41a, 41a tend to move vertically. When the rear ends 41a, 41a move vertically, the third crossmember 23 is deformed as shown by imaginary lines, rearward as shown by an arrow b.

In order to prevent deformation of the third crossmember 23, the right and left reinforcing plates 43, 43 are provided at the portions 65, 65 (only the left portion 65 is shown in FIGS. 3 and 4) in contact with the right and left extension members 41, 41, in the space 64 in the hollow section of the third crossmember 23.

Specifically, the plate bodies 75, 75 of the right and left reinforcing plates 43, 43 are disposed diagonally from the corner 72 formed by the front wall 68 and the bottom portion 61 of the third crossmember 23 to the corner 73 formed by the rear wall 66 and the ceiling portion 71. With this, the plate bodies 75, 75 are under tensile load. Even if the thickness of the plate bodies 75, 75, that is, the thickness of the right and left reinforcing plates 43, 43 is relatively thin and the plate bodies 75 are formed with the openings 77a (see FIG. 4), the third crossmember 23 can be prevented from deformation. As a result, the vehicle body structure 30 can be reduced in weight.

In addition, the right and left reinforcing plates 43, 43 are provided at the portions 65, 65 in contact with the right and left extension members 41, 41, so that the right and left reinforcing plates 43, 43 are firmly supported on the right and left extension members 41, 41. Thus, the right and left reinforcing members 43, 43 do not need to be made larger, and can be reduced in size and weight.

The small-size light-weight right and left reinforcing plates 43, 43 are easily housed in the space 64 in the hollow section of the third crossmember 23, and a relatively large space can be easily provided around the right and left center frame members 35, 35 and the third crossmember 23.

The shape of the right and left extension members 41, 41 and the shape of the right and left reinforcing plates 43, 43 described in this embodiment are exemplary and not limiting. That is, the right and left extension members 41, 41 may be of any shape as long as they can be provided at the rear end portions 35a, 35a of the right and left center frame members 35, 35, extending the rear end portions of the right and left center frame members 35, 35 so that the third crossmember 23 is placed on and joined to the rear end portions.

Also, the right and left reinforcing plates 43, 43 may be of any shape as long as they can be provided at the portions 65, 65 in contact with the right and left extension members 41, 41, in the space 64 of the third crossmember 23, thereby preventing deformation of the third crossmember 23.

Obviously, various minor changes and modifications of the present invention are possible in the light of the above teaching. It is therefore to be understood that within the scope of the appended claims the invention may be practiced otherwise than as specifically described.

What is claimed is:

1. A vehicle body structure, comprising:
   a body;
   right and left side sills extending longitudinally of the body;
   a crossmember of a hollow section extending between the right and left side sills;
   at least one center frame member extending forward of the body from a position substantially adjacent to, but spaced forwardly from, a middle portion of the crossmember;
   an extension member provided at a rear end portion of the center frame member, said extension member extending rearwardly from the center frame member and being joined to the crossmember, which is placed thereon, said extension member serving to interconnect the at least one center frame member rear end portion with said crossmember; and
   at least one reinforcing plate provided in a space of the hollow section of the crossmember at a portion to which the extension member is joined, for preventing deformation of the crossmember.

2. The vehicle body structure according to claim 1, wherein the at least one reinforcing plate includes a plate body, the plate body being disposed diagonally from a corner formed by a front wall and a bottom portion of the crossmember to a corner formed by a rear wall and a ceiling portion of the crossmember.

3. A structure for supporting a vehicle body, comprising:
   right and left side sills extending longitudinally of the vehicle body;
   a crossmember of a hollow section disposed between the right and left side sills;
   at least one center frame member extending forwardly away from the crossmember and having an extension member provided at a rear end portion thereof, said extension member extending rearwardly from the center frame member rear end portion and serving to interconnect the at least one center frame member rear end portion and said crossmember, said extension member being joined to the crossmember at a first location on the crossmember; and
   at least one reinforcing plate provided in a space of the hollow section of the crossmember at the first location.

4. The vehicle body supporting structure according to claim 3, wherein the at least one reinforcing plate includes a plate body, the plate body being disposed diagonally from a corner formed by a front wall and a bottom portion of the crossmember to a corner formed by a rear wall and a ceiling portion of the crossmember.

5. A vehicle body structure, comprising:
   a body;
   right and left side sills extending longitudinally of the body;
   a crossmember of a hollow section extending between the right and left side sills;
   at least one center frame member extending forward of the body from a substantially middle portion of the crossmember;
   an extension member provided at a rear end portion of the center frame member, said extension member extending rearwardly and being joined to the crossmember placed thereon; and
   at least one reinforcing plate provided in a space of the hollow section of the crossmember at a portion to which the extension member is joined, for preventing deformation of the crossmember, wherein the at least one reinforcing plate includes a plate body, the plate body being disposed diagonally from a corner formed by a front wall and a bottom portion of the crossmember to a corner formed by a rear wall and a ceiling portion of the crossmember.

* * * * *